(12) United States Patent
Coburn et al.

(10) Patent No.: US 8,195,022 B2
(45) Date of Patent: Jun. 5, 2012

(54) FIBER OPTIC ADAPTER CASSETTE AND PANEL

(75) Inventors: Hutch Coburn, Eden Prairie, MN (US); Mark Smrha, Burnsville, MN (US); Chad Sjodin, Hopkins, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 493 days.

(21) Appl. No.: 12/371,737

(22) Filed: Feb. 16, 2009

(65) Prior Publication Data

US 2009/0214171 A1    Aug. 27, 2009

Related U.S. Application Data

(63) Continuation of application No. 11/655,764, filed on Jan. 19, 2007, now Pat. No. 7,493,002.

(51) Int. Cl.
*G02B 6/00* (2006.01)

(52) U.S. Cl. .................. 385/135; 385/134; 379/325

(58) Field of Classification Search .......... 385/134–136; 379/325

See application file for complete search history.

(56) References Cited

U.S. PATENT DOCUMENTS

| | | | |
|---|---|---|---|
| 5,212,761 A | 5/1993 | Petrunia |  |
| 5,274,729 A | 12/1993 | King et al. |  |
| 5,363,465 A | 11/1994 | Korkowski et al. |  |
| 5,432,875 A | 7/1995 | Korkowski et al. |  |
| 5,708,742 A | 1/1998 | Beun et al. |  |
| 5,975,769 A | 11/1999 | Larson et al. |  |
| 6,208,796 B1 | 3/2001 | Williams Vigliaturo |  |
| D448,005 S | 9/2001 | Klein, Jr. et al. |  |
| 6,474,876 B1 | 11/2002 | Sikorski, Jr. |  |
| 6,556,763 B1 | 4/2003 | Puetz et al. |  |
| 6,760,531 B1 | 7/2004 | Solheid et al. |  |
| 6,850,685 B2 * | 2/2005 | Tinucci et al. | 385/134 |
| 6,863,446 B2 | 3/2005 | Ngo |  |
| 6,916,199 B2 | 7/2005 | Follingstad |  |
| 6,920,274 B2 | 7/2005 | Rapp et al. |  |
| 7,059,779 B2 | 6/2006 | Khor |  |
| 7,116,777 B2 | 10/2006 | Knudsen et al. |  |
| 7,346,254 B2 | 3/2008 | Kramer et al. |  |
| 7,357,667 B2 | 4/2008 | Clark et al. |  |
| 7,418,181 B2 | 8/2008 | Zimmel et al. |  |
| 7,493,002 B2 | 2/2009 | Coburn et al. |  |
| 7,974,509 B2 * | 7/2011 | Smith et al. | 385/135 |

(Continued)

FOREIGN PATENT DOCUMENTS

GB    2 166 262 A    4/1986

(Continued)

OTHER PUBLICATIONS

TrueNet® Structured Cabling; Fiber Connectivity Solutions; RMG Series Fiber Enclosures; Mar. 2006; p. 278.

(Continued)

*Primary Examiner* — Ellen Kim (74) *Attorney, Agent, or Firm* — Merchant & Gould P.C.

(57) ABSTRACT

An adapter cassette including a housing and a plurality of fiber optic adapters. The fiber optic adapters being angled relative to a front plane defined by the housing. The fiber optic adapters being interconnected to a multi-fiber cable connecter by fiber optic cables located within an interior of the housing. The adapter cassette further including a quick-release cover that provides access to the interior of the housing.

13 Claims, 7 Drawing Sheets

U.S. PATENT DOCUMENTS

| | | | |
|---|---|---|---|
| 2002/0181896 A1* | 12/2002 | McClellan et al. | 385/88 |
| 2003/0108320 A1 | 6/2003 | Letourneau et al. | |
| 2005/0100301 A1* | 5/2005 | Solheid et al. | 385/135 |
| 2005/0111809 A1 | 5/2005 | Giraud et al. | |
| 2006/0093301 A1* | 5/2006 | Zimmel et al. | 385/135 |
| 2006/0093304 A1 | 5/2006 | Battey et al. | |
| 2008/0175550 A1 | 7/2008 | Coburn et al. | |

FOREIGN PATENT DOCUMENTS

| | | | |
|---|---|---|---|
| WO | WO 2008/089192 A1 | 7/2008 | |

OTHER PUBLICATIONS

TrueNet® Structured Cabling; Fiber Connectivity Solutions; RMG Series Fiber Enclosures; Mar. 2006; p. 271.

ADC Telecommunications, *Filter Management Tray*, 8 pgs., Mar. 2003.

ADC Telecommunications, OmniReach™ FTTX Solutions, 12 pgs., Jul. 2006.

\* cited by examiner

FIG.8

FIBER OPTIC ADAPTER CASSETTE AND PANEL

CROSS-REFERENCE TO RELATED APPLICATIONS

This application is a continuation application of U.S. application Ser. No. 11/655,764, filed Jan. 19, 2007, now U.S. Pat. No. 7,493,002; which application is incorporated herein by reference.

FIELD OF THE INVENTION

This disclosure relates to devices for use in the telecommunications industry. More specifically, this disclosure relates to termination devices for use with fiber optic cables.

BACKGROUND OF THE INVENTION

Many local area networks and telecommunication systems utilize termination panels to provide cross-connection between telecommunications equipment. Termination panels typically include front and rear connections. Equipment and cable management devices are often located adjacent to the termination panels.

Improvements are needed in the methods and devices for managing networks and telecommunication systems, generally to better accommodate repair, maintenance, and/or upgrade procedures associated with connections of the networks and systems. Improvements are also needed with regards to organizing the networks and telecommunication systems, generally to better accommodate cable routing flow of such networks and systems.

SUMMARY OF THE INVENTION

The present disclosure relates to an adapter cassette including a housing and a plurality of fiber optic adapters that are interconnected to a multi-fiber cable adapter. The housing has a front wall that defines a front plane. The fiber optic adapters are preferably angled relative to the front plane of the housing. The adapter cassette further includes a quick-release cover that provides access to the interior of the housing.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
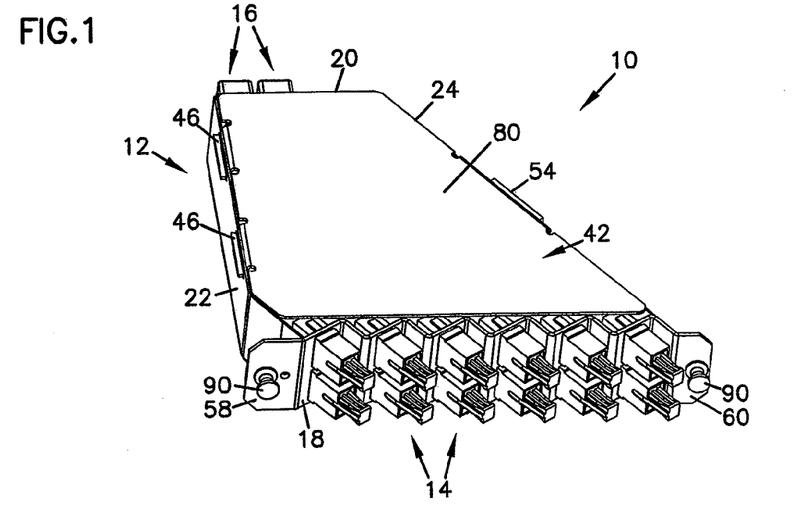
FIG. 1 is a front perspective view of one embodiment of an adapter cassette, in accordance with the principles disclosed, shown with SC type adapters.

FIG. 1 illustrates one embodiment of an adapter module or cassette 10 in accordance with the principles disclosed. The adapter cassette 10 can be used in a variety of telecommunication applications, as will be described in greater detail hereinafter.

Figure 2:
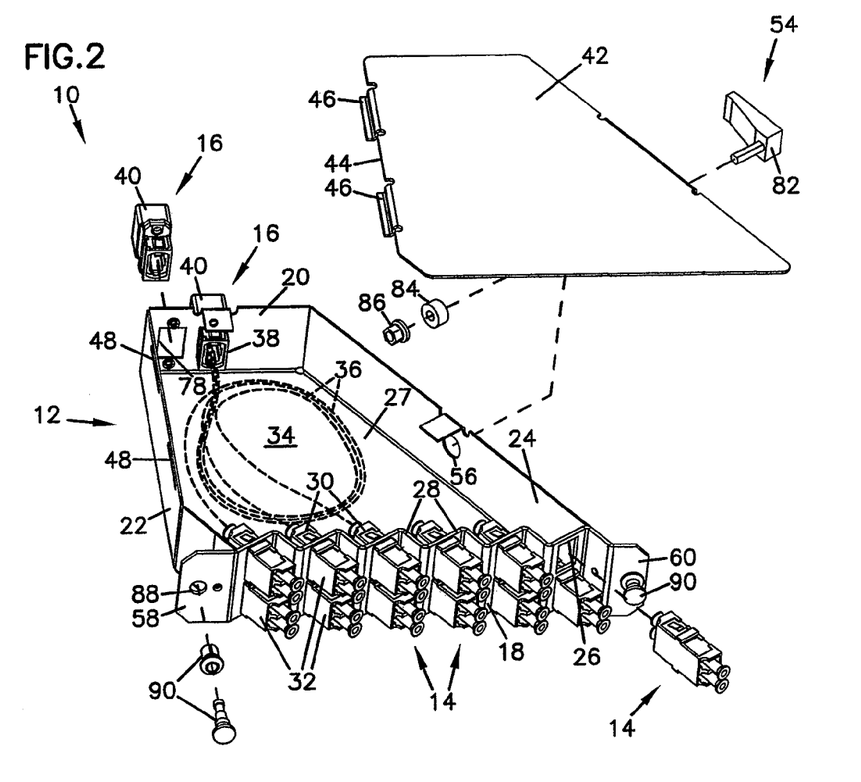
FIG. 2 is an exploded, front perspective view of the adapter cassette of FIG. 1, shown with LC type adapters.

Referring to FIGS. 1 and 2, the adapter cassette 10 generally includes a housing 12 having an interior 34, a plurality of fiber optic adapters 14, and at least one multi-fiber cable adapter 16. The multi-fiber cable adapter 16 is interconnected to the fiber optic adapters 14 by optical cable connections 36 (shown schematically) located within the interior 34 of the housing 12. In the illustrated embodiment, the cassette 10 has two multi-fiber cable adapters 16, each cable adapter 16 interconnecting to six of twelve fiber optic adapters 14.

The housing 12 is a generally wedge-shaped housing defined by a number of housing walls. The number of housing walls includes, for example, a front wall 18, a rear wall 20 opposite the front wall, a first side wall 22 extending between the front wall and the rear wall, a second side wall 24 opposite the first side wall and extending between the front wall and the rear wall, and a bottom wall 27 (FIG. 2). While reference is made with respect to front, rear, side, and bottom walls, the particular orientation of the cassette described by referring to a wall as a "bottom" wall is made only for purposes of describing the particular orientation illustrated. As can be understood, in other applications, the bottom wall of the housing can define the top of the housing or the side of the housing, for example, depending upon the mounting orientation of the cassette.

Figure 3:
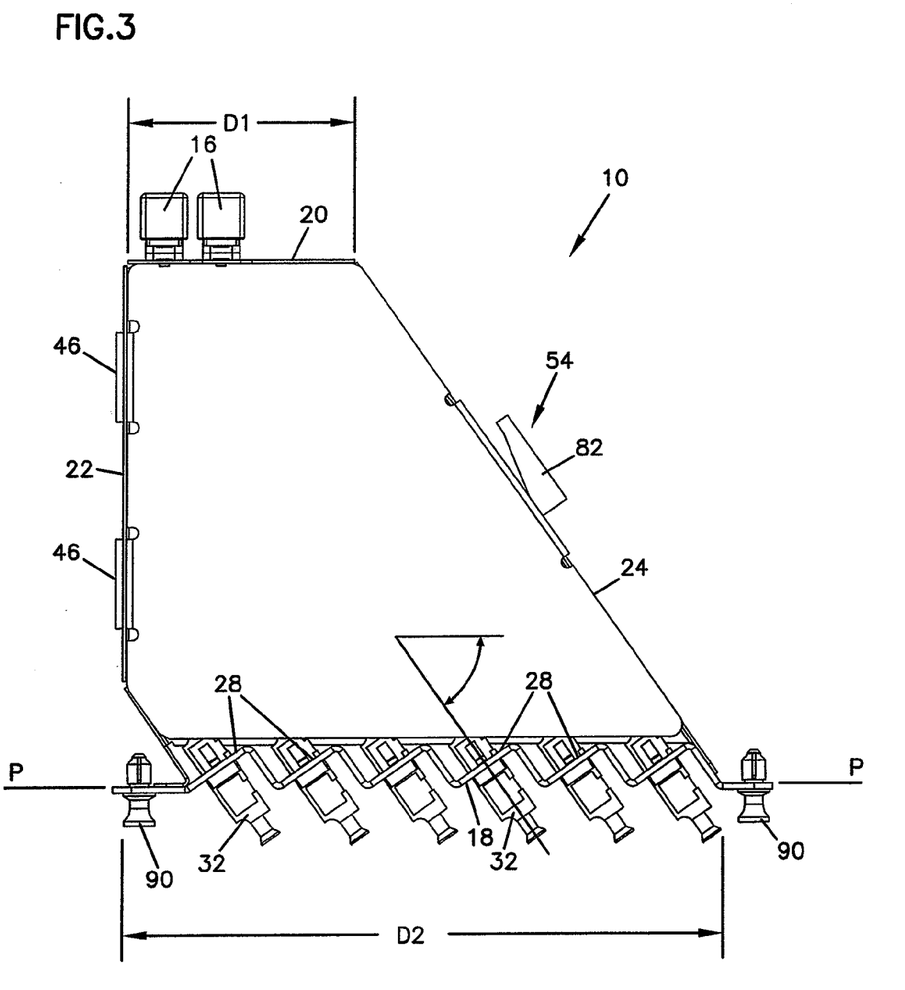
FIG. 3 is a top plan view of the adapter cassette of FIG. 2, illustrating a cover in a latched position.

Referring now to FIG. 3, in the illustrated embodiment, the rear wall 20 of the wedge-shaped housing is shorter than the front wall 18 of the housing. In particular, the rear wall 20 of the housing extends a first distance D1 between the first side wall 22 and the second side wall 24. The front wall 18 extends a second distance D2 between the first side wall 22 and the second side wall 24. The first distance D1 of the rear wall 20 is less than the second distance D2 of the front wall 18. In the illustrated embodiment, the first distance D1 is less than one-half the second distance D2. In the alternative, the second side wall 24 is an angled side wall that extends between the shorter rear wall 20 and the longer front wall 18 in a non-parallel direction relative to the first side wall 22. In general, the wedge shape defined by the walls 18, 20, 22, 24 of the housing 12 minimizes the space occupied by the cassette 10 when mounted to or in enclosures, drawers, and panels, for example.

Figure 4:
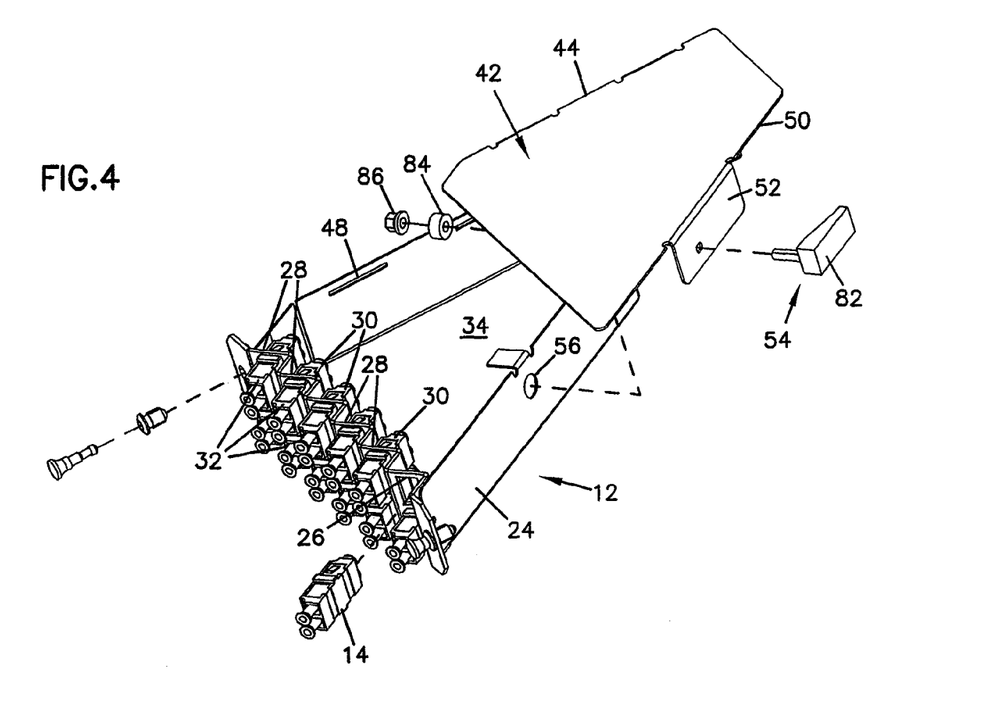
FIG. 4 is an exploded, side perspective view of the adapter cassette of FIG. 2.

Referring now to FIGS. 2-4, the front wall 18 of the housing defines a plurality of openings 26. The fiber optic adapters 14 are mounted within the openings 26 of the front wall. In the illustrated embodiment, the front wall 18 is a corrugated front wall that defines a number of angled notches 28. The openings 26 are located in the angled notches 28 of the corrugated front wall 18.

As shown in FIG. 2, a pair of openings 26 is provided in each of the angled notches 28. Each opening 26 receives one of the fiber optic adapters 14. The fiber optic adapters 14 can include, for example, LC type adapters (shown with dust plugs in FIG. 2), SC type adapters (shown with dust plugs in FIG. 1), ST type adapters, or FC type adapters. Other types of adapters or mating connectors can be used in accordance with the principles disclosed. For example, in some applications, copper cables may be used coextensively with or exclusively from fiber optic cables; and accordingly various types of wire terminations or wire connectors can be provided at the front of the housing. In other words, the cassette can be adapted for use in copper applications, applications having hybrid cabling, or applications having both types of fiber optic and copper cabling, in accordance with the principles disclosed.

Referring again to FIGS. 2-4, each of the adapters 14 of the cassette 10 is mounted within the openings 26 of the front wall 18 such that an interior connection end 30 (FIG. 4) of the adapter is located within the interior 34 of the housing 12; and such that an exterior connection end 32 of the adapter 14 is located outside of the housing. The openings 26 of the corrugated front wall 18 are further arranged such that the exterior connection ends 32 of the adapters 14 are angled (FIG. 3) in a direction toward the second side wall 24 of the housing. That is, the adapters 14 are angled in a non-perpendicular direction relative to a plane P-P (FIG. 3) defined by the front wall 18 of the housing 12. As will be discussed in greater detail, the adapters 14 are angled to provide a directional cabling exit out of or away from the cassette 10.

Referring back to FIG. 2, the multi-fiber cable adapters 16 of the cassette 10 are mounted on the rear wall 20 of the housing 12, generally adjacent to the first side wall 22 (see FIG. 3). In particular, the cable adapters 16 are mounted within openings 78 provided in the rear wall 20. Each opening 78 receives one of the multi-fiber cable adapters 16. The multi-fiber cable adapters 16 can include, for example, MPO adapters. Other types of adapters or mating connectors can be used in accordance with the principles disclosed.

Each of the cable adapters 16 is configured to connect to a cable having multiple optical fibers, for example, six optical fibers. The multi-fiber cable adapters 16 also have an interior connection end 38 located within the interior 34 of the housing 12, and an exterior connection end 40 (shown with a dust cap) located outside of the housing. The optical cable connections 36 provide interconnections between the interior connection ends 38 of the multi-fiber cable adapters 16 and the interior connection ends 30 of the fiber optic adapters 14.

Referring again to FIGS. 1 and 2, the adapter cassette 10 of the present disclosure includes a quick-release cover 42. The quick-release cover 42 is designed to provide fast access to the interior 34 of the housing 12. When the cover 42 is secured to the housing 12, the cover 42 generally defines a top wall 80 (FIG. 1) of the housing that encloses the optical cable connections 36 and the interior connection ends 30, 38 of the adapters 14 and the cable adapters 16.

Referring still to FIGS. 1 and 2, the cover 42 of the cassette 10 has a generally wedge-like shape that corresponds to the wedge shape of the housing 12. A first edge 44 of the cover includes tabs 46 that engage corresponding slots 48 formed in the first side wall 22 of the housing. Referring to FIG. 4, a second opposite edge 50 of the cover 42 includes a flange 52 on which a latch 54 is mounted. The latch 54 functions to detachably secure the cover 42 to the housing 12.

Referring now to FIG. 4, the flange 52 extends generally perpendicular to the cover 42. When the cover 42 is mounted to the housing 12, the flange 52 wraps about the second side wall 24 of the housing such that the latch 54 is accessed from the side of the housing when mounted with the bottom wall 27 of the housing down.

The cover 42 provides quick and selective access to the interior 34 of the housing 12. In particular, the cover detachably secures to the housing 12 and can be easily removed to repair, maintain, or upgrade the components contained within the housing 12 of the adapter cassette 10.

In the present arrangement, the attachment of the cover 42 to the housing 12 is provided only by the single latch 54; that is, the one latch itself secures the attachment of the cover 42 to the housing 12, and releases the attachment of the cover from the housing. A technician need only unlock the one latch 54, as opposed to multiple latches, to detach the cover 42 from the housing 12; and need only lock the one latch 54, as opposed to multiple latches, to securely attach the cover to the housing.

Locking only the one latch 54 securely attaches the cover 42 to the housing 12 by securing the engagement of the tabs 46 of the cover within the slots 48 of the housing. If the one latch 54 is locked, the cover 42 cannot be detached or removed from the housing 12. Likewise, unlocking only the one latch permits the cover to be removed from the housing. This arrangement provides quick and easy access to the interior 34 of the cassette reducing time associated with maintenance, upgrade, or repair procedures.

Figure 4A:
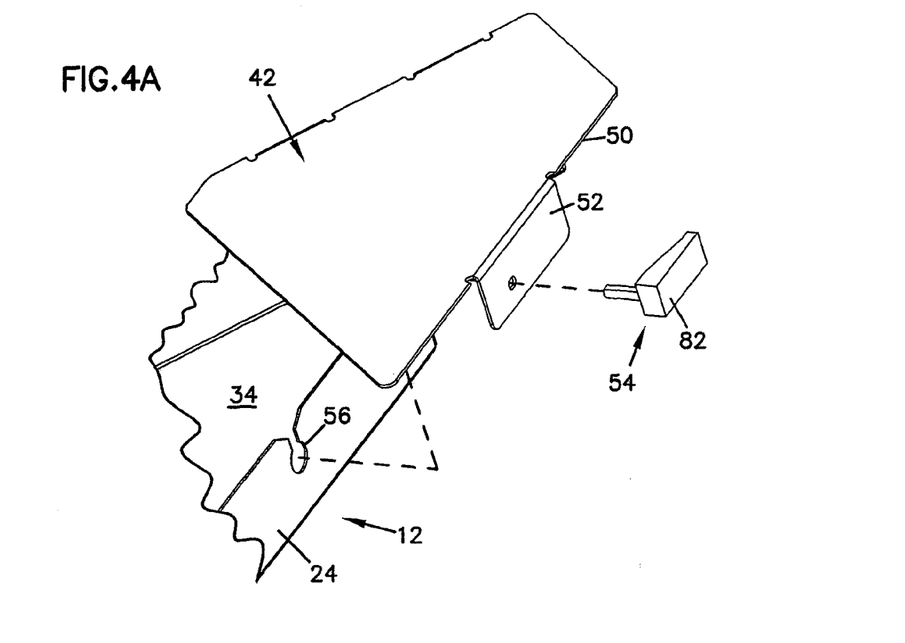
FIG. 4A is a partial view of the adapter cassette of FIG. 4, illustrating an alternative latching aperture.
Figure 5:
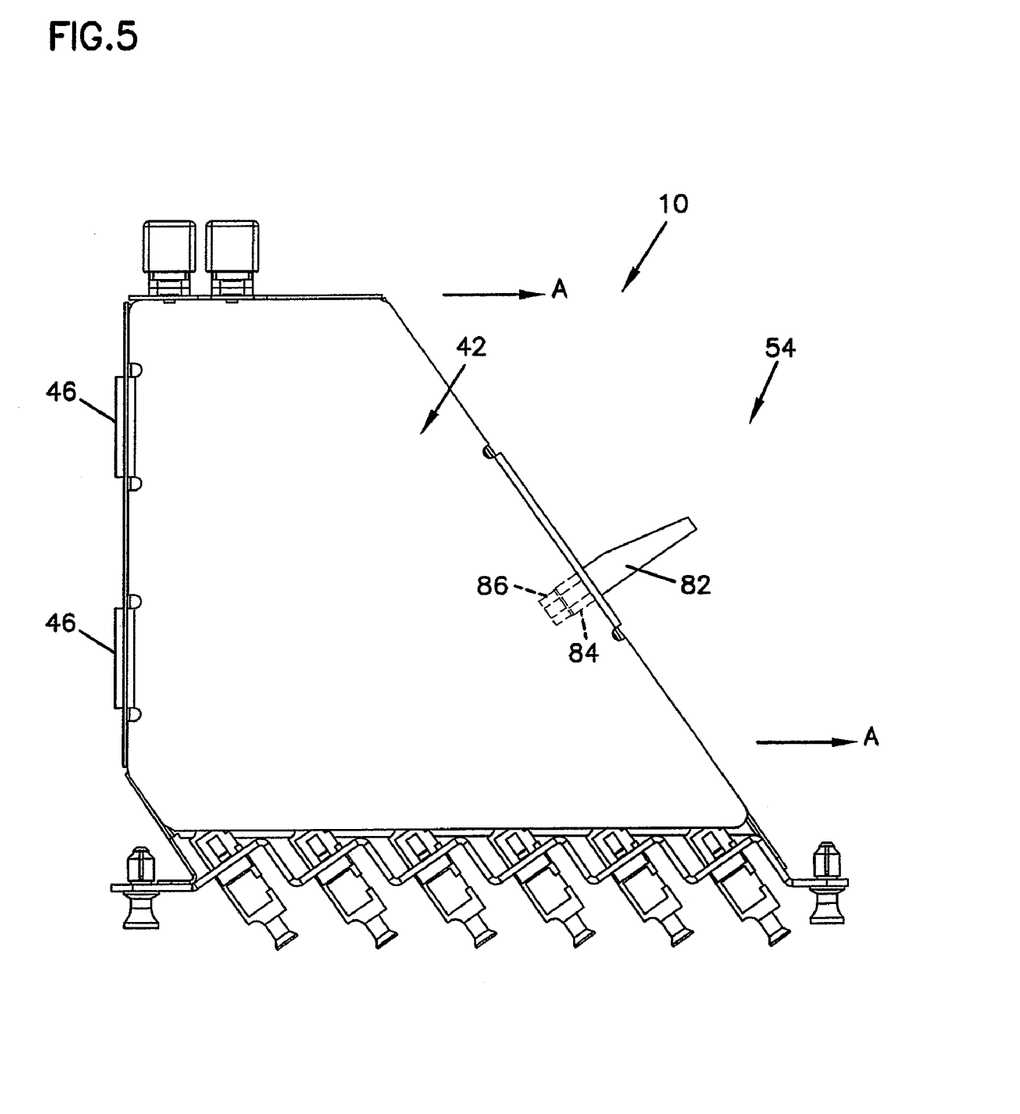
FIG. 5 is a top plan view of the adapter cassette of FIG. 3, illustrating the cover in an unlatched position.

In the illustrated embodiment, the single latch 54 of the cover 42 is a swell-type latch including a latch handle assembly 82 and a compressible member 84 secured to the latch handle assembly 82 by a nut 86. The compressible member 84 is configured to fit through a latching aperture 56 formed in the second side wall 24 of the housing 12 when in a non-compressed state. The latching aperture 56 can include a hole (shown in FIGS. 2 and 4), a slot, or a slotted hole (shown in FIG. 4A), for example. The member 84 is in the non-compressed state when the latch 54 is unlatched, as shown in FIG. 5. When the latch is unlatched, the cover is removed by moving the cover in the direction A such that the tabs 46 disengage from the slots 48 of the housing, and then removing compressible member 84 from the latching aperture 56. Similarly, when the latch is unlatched, the cover 42 can be attached to the housing 12 by inserting the compressible member 84 through or into the latching aperture 56 and engaging the tabs 46 of the cover in the slots 48 of the housing. Latching or flipping the latch handle assembly 82 to the latched position shown in FIG. 3 secures the cover 42 to the housing 12.

When the latch handle assembly 82 of the latch 54 is positioned or latched (FIG. 3), the compressible member 84 is compressed such that the diameter of the member no longer fits through the latching aperture 56 in the side wall 24. In general, the swell-type latch detachably secures the cover 42 to the housing 12, and enables easily removal of the cover for quick access to the interior 34 of the housing. Other types of latches can be used in accordance with the principles disclosed.

Referring back to FIGS. 1 and 2, the adapter cassette 10 presently disclosed includes mounting flanges 58, 60 for mounting the cassette to a telecommunications structure. The mounting flanges 58, 60 are formed as part of the front wall 18 of the housing 12. The mounting flanges 58, 60 include holes 88 (FIG. 2) sized for receipt of fasteners 90, such as push pin fasteners, to mount the cassette to the telecommunications structure. In the illustrated embodiment, the mounting flanges 58, 60 are side flanges provided adjacent to the first side wall 22 of the housing and the second side wall 24 of the housing. Top and bottom mounting flanges extending from the front wall, or other mounting flanges extending from other housing walls, can also be provided in accordance with the principles disclosed.

Figure 6:
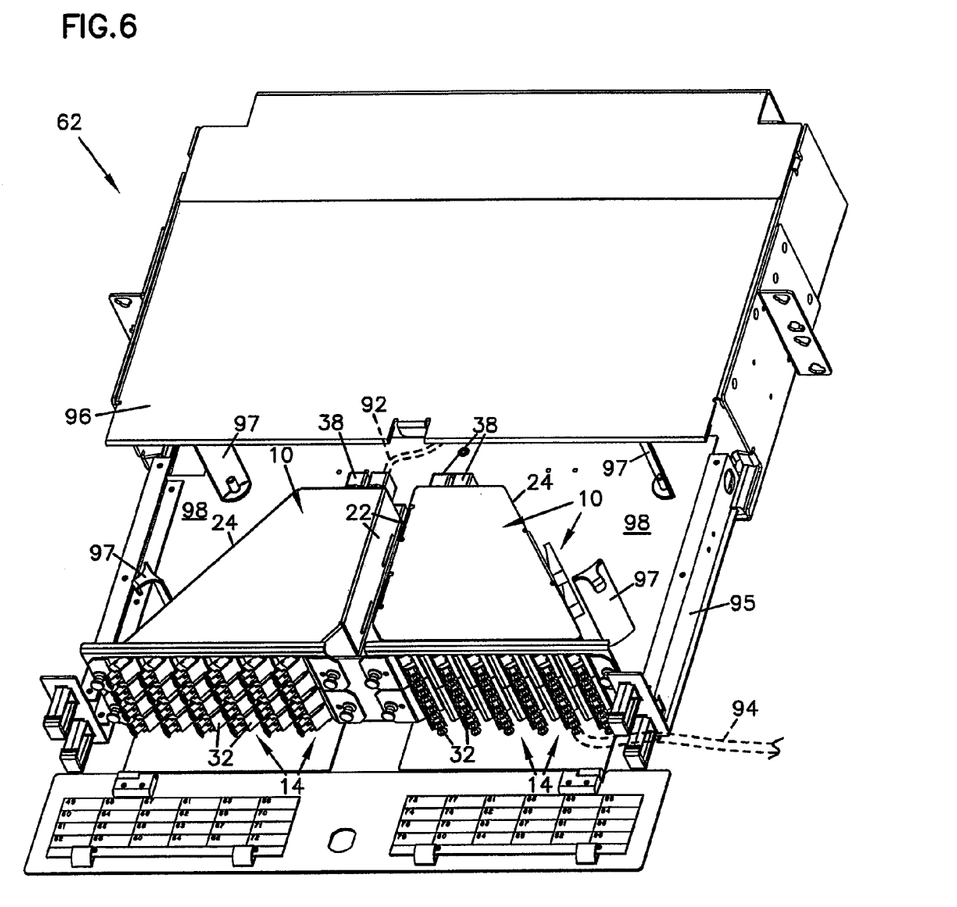
FIG. 6 is a front perspective view of a panel including a number of the adapter cassettes of FIG. 2, in accordance with the principles disclosed.

Referring now to FIG. 6, the adapter cassette 10 of the present disclosure is illustrated in use in a termination panel 62 of a telecommunications system. The illustrated termination panel 62 is commonly mounted to a telecommunication equipment rack or equipment enclosure (not shown). In this application, a number of cassettes 10 (e.g., four) are mounted to a drawer 95 of a panel chassis 96. Cables 92 (only one schematic representation shown) are terminated to the external connection end 38 of the multi-fiber cable adapters 16 of the cassettes 10. As previously described, optical cable connections (e.g. 36 shown in FIG. 2) interconnect the rear multi-fiber cable adapters 16 to the front adapters 14 of the cassettes 10.

Jumper cables or patching cables 94 (only one schematic representation shown) can be connected to the external connection end 32 of the front adapters 14 to provide interconnections between the termination panel 62 and equipment mounted on the rack or in the enclosure. In this panel 62, the cassettes 10 are arranged such that the accessible exterior connection ends 32 of the adapters 14 angle toward the side of the panel 62. This accommodates a sideward routing flow of the patching cables 94 such that the patching cables are more effectively routed to areas adjacent the termination panel 62 where cable routing guides and cable channels are often provided.

As can be seen in FIG. 6, the wedge-shape housing 12 of the cassette 10 minimizes the spatial requirements of the cassette within the panel chassis 96. In this arrangement, the wedge-shape housings 12 of the plurality of adapter cassettes 10 are arranged in a side-by-side relationship such that the first side walls 22 of the cassettes are located adjacent to one another. The second angled side walls 24 of the cassettes 10 angle toward the center region of chassis 96 and provide extra space in the lateral regions 98 of the drawer 95 and chassis 96.

The extra space provided by the wedge-shaped housing can be utilized for addition components or cable routings. In the illustrated embodiment, radius-limiting cable guides 97 are provided in the lateral regions 98 so that excess cabling can be routed or stored within the region 98 adjacent to the cassettes. The side-by-side cassettes define a first pair of cassettes. As shown in FIG. 6, a second pair of cassettes can be stacked upon the first pair of cassettes in the same orientation to preserve the extra space in the lateral regions.

Figure 7:
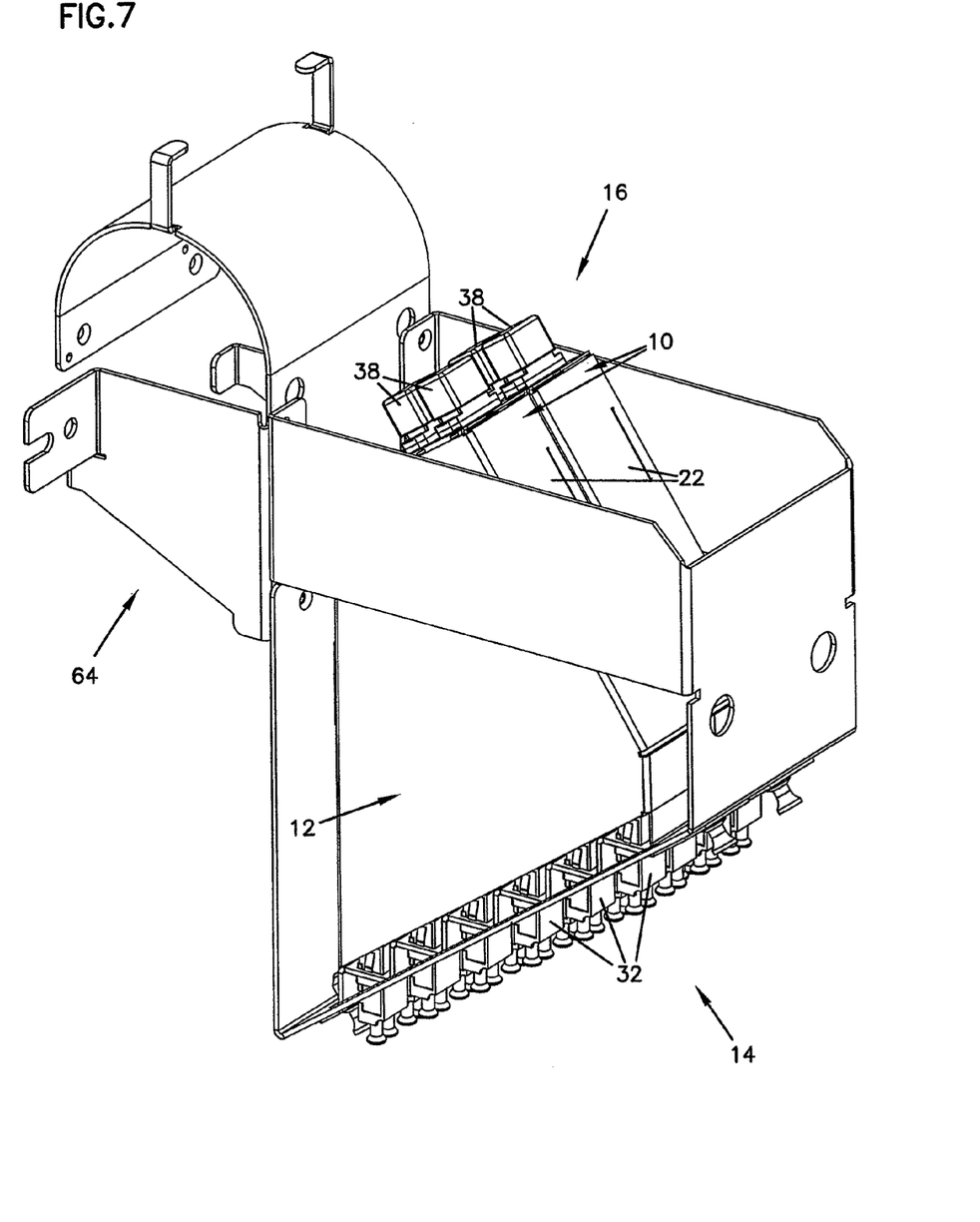
FIG. 7 is a side perspective view of an overhead device including a number of the adapter cassettes of FIG. 2, in accordance with the principles disclosed.
Figure 8:
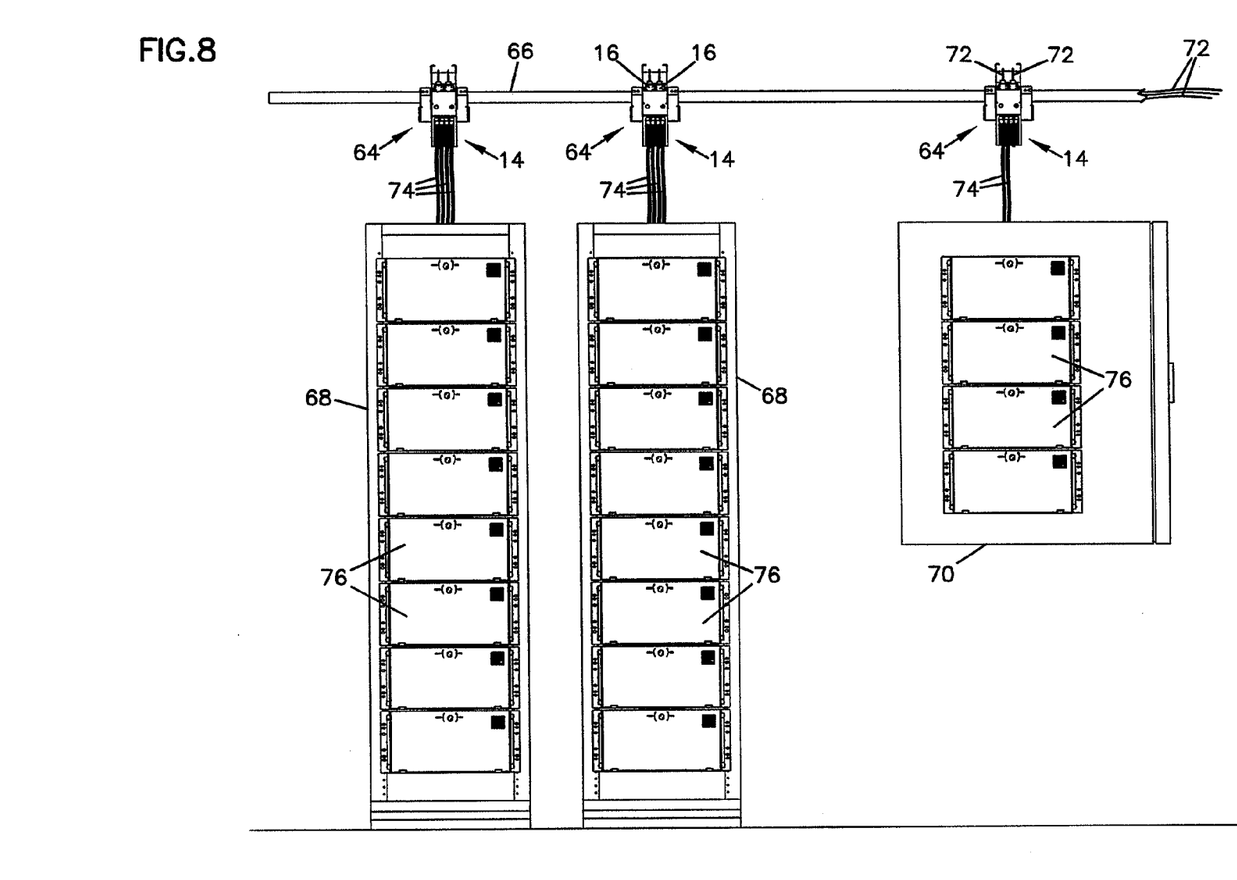
FIG. 8 is a front view of a system including the overhead device of FIG. 6, in accordance with the principles disclosed.

The present adapter cassette 10 can also be used in other panel arrangements, frames, or devices. For example, referring to FIGS. 7 and 8, the adapter cassette 10 is used in a termination device 64 that mounts to an overhead cable pathway structure of a telecommunications system (FIG. 8). In this system, the overhead cable pathway structure 66 is hung above racks (e.g. 68), cabinets (e.g., 70), and/or other equipment enclosures or framework. Cables 72 are routed to the devices 64 and terminated to the external connection ends 38 (FIG. 7) of the multi-fiber cable adapters 16 of the cassettes 10. Jumper cables or patching cables 74 (FIG. 8) can be connected to the external connection end 32 (FIG. 7) of the adapters 14 to provide interconnections between the overhead device 64 and equipment 76 mounted on the rack 68 or in the cabinet 70. Further details of the overhead system illustrated in FIGS. 7 and 8 are described in U.S. Pat. No. 7,463,812; the disclosure of which is incorporated herein by reference.

The above specification provides a complete description of the present invention. Since many embodiments of the invention can be made without departing from the spirit and scope of the invention, certain aspects of the invention reside in the claims hereinafter appended.

What is claimed is:

1. A termination panel, comprising:
   a) a chassis; and
   b) a plurality of adapter cassettes mounted to the chassis, each of the cassettes including:
      i) a wedge-shape housing having a number of walls that define an interior, the number of walls including a rear wall and a corrugated front wall, the corrugated front wall defining openings, the openings being located within angled notches of the corrugated front wall;
      ii) a multi-fiber cable adapter mounted to the rear wall of the wedge-shape housing;
      iii) a plurality of fiber optic adapters mounted within the openings of the corrugated front wall, the fiber optic adapters being oriented at a non-perpendicular angle relative to a front plane defined by the corrugated front wall of the wedge-shape housing;
      iv) optical cable connections located within the interior of the wedge-shape housing, the optical cable connections being connected to the multi-fiber cable adapter and the fiber optic adapters; and
      v) mounting flanges for mounting the adapter cassette to the chassis, the mounting flanges extending outward from the corrugated front wall of the wedge-shape housing.

2. The termination panel of claim 1, wherein the rear wall of the wedge-shape housing is shorter than the corrugated front wall.

3. The termination panel of claim 1, wherein the number of walls of the wedge-shape housing further includes first and second opposing side walls, the first and second side walls being non-parallel to one another.

4. The termination panel of claim 1, wherein the fiber optic adapters include LC type adapters.

5. The termination panel of claim 1, wherein the fiber optic adapters include SC type adapters.

6. The termination panel of claim 1, wherein each angled notch of the corrugated front wall defines two openings, each opening receiving one fiber optic adapters of the plurality of fiber optic adapters.

7. The termination panel of claim 1, further including a multi-fiber cable connected to the multi-fiber cable connector, and at least one patching cable connected to one of the fiber optic adapters.

8. The termination panel of claim 1, wherein the number of walls of the wedge-shape housing further includes a top wall, the top wall being defined by an attachable cover.

9. The termination panel of claim 8, wherein the attachable cover includes only a single moveable latch that affixes the cover relative to the other walls of the wedge-shape housing.

10. The termination panel of claim 1, wherein the chassis includes a sliding drawer.

11. The termination panel of claim 10, wherein lateral space is provided adjacent to a wedged portion of the wedge-shape housing of the adapter cassettes for selective use as cable routing space.

12. The termination panel of claim 1, wherein the number of walls of the wedge-shape housing further includes a first side wall extending between the corrugated front wall and the rear wall and a second angled side wall extending between the corrugated front wall and the rear wall, and wherein the plurality of adapter cassettes are mounted in a side-by-side relationship such that the first side walls of the adapter cassettes are located adjacent to one another.

13. The termination panel of claim 12, wherein the adapter cassettes mounted in the side-by-side relationship define a first pair of adapter cassettes, the plurality of adapter cassettes including a second pair of adapter cassettes stacked upon the first pair of adapter cassettes.

* * * * *